(12) United States Patent
You et al.

(10) Patent No.: US 12,732,706 B2
(45) Date of Patent: Sep. 8, 2026

(54) IMAGE SENSOR WITH PARTITION EXPOSURE, PARTITION EXPOSURE CONTROL METHOD, CAMERA MODULE, AND ELECTRONIC DEVICE

(71) Applicant: VIVO MOBILE COMMUNICATION CO., LTD., Guangdong (CN)

(72) Inventors: Honghao You, Guangdong (CN); Jiaming Su, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 0 days.

(21) Appl. No.: 18/759,477

(22) Filed: Jun. 28, 2024

(65) Prior Publication Data

US 2024/0357243 A1 Oct. 24, 2024

Related U.S. Application Data

(63) Continuation of application No. PCT/CN2022/142698, filed on Dec. 28, 2022.

(30) Foreign Application Priority Data

Dec. 30, 2021 (CN) ......................... 202111680855.X

(51) Int. Cl.
*H04N 23/73* (2023.01)
*H04N 23/71* (2023.01)

(52) U.S. Cl.
CPC ............. *H04N 23/73* (2023.01); *H04N 23/71* (2023.01)

(58) Field of Classification Search
CPC ...... H04N 23/71; H04N 23/73; H04N 25/535; H04N 25/583; H04N 25/77
See application file for complete search history.

(56) References Cited

U.S. PATENT DOCUMENTS 7,714,928 B2 * 5/2010 Kamon ................ H04N 23/741 348/364
2010/0321525 A1 12/2010 Nagata
(Continued)

FOREIGN PATENT DOCUMENTS

CN 109842768 A 6/2019
CN 112887571 A 6/2021
(Continued)

OTHER PUBLICATIONS

International Search Report and Written Opinion for PCT Application No. PCT/CN2022/142698, Mailed Mar. 2, 2023, 16 pages.
(Continued)

*Primary Examiner* — Antoinette T Spinks
(74) *Attorney, Agent, or Firm* — BROOKS KUSHMAN P.C.

(57) ABSTRACT

An image sensor, an exposure control method, a camera module, and an electronic device. The image sensor includes a photosensitive element, a reset switch, and a signal control circuit. The signal control circuit includes a voltage logic determining module and a logic control module. A first end of the voltage logic determining module is connected to a first end of the photosensitive element, and a second end of the voltage logic determining module is connected to a second end of the photosensitive element. A first input end of the logic control module is connected to the first end of the voltage logic determining module, an output end of the logic control module is connected to the reset switch.

20 Claims, 4 Drawing Sheets

Obtain preset brightness of a first image, and first partition brightness and first exposure corresponding to each image region of the first image — 301

Obtain second exposure corresponding to each image region based on the preset brightness, and the first partition brightness and the first exposure corresponding to each image region — 302

Expose a second image captured by the image sensor based on the second exposure corresponding to each image region — 303

(56) References Cited

U.S. PATENT DOCUMENTS

| | | | |
|---|---|---|---|
| 2010/0328478 | A1 | 12/2010 | Tanaka et al. |
| 2013/0308044 | A1 | 11/2013 | Mitsunaga |
| 2021/0344865 | A1 | 11/2021 | Guo et al. |

FOREIGN PATENT DOCUMENTS

| | | | |
|---|---|---|---|
| CN | 113286092 | A | 8/2021 |
| CN | 113301261 | A | 8/2021 |
| CN | 113301262 | A | 8/2021 |
| CN | 114339001 | A | 4/2022 |
| JP | H07298142 | A | 11/1995 |
| JP | 2011004089 | A | 1/2011 |
| JP | 2011010054 | A | 1/2011 |
| JP | 2012175234 | A | 9/2012 |
| JP | 2021036677 | A | 3/2021 |
| JP | 7298142 | B2 | 6/2023 |

OTHER PUBLICATIONS

First Japanese Office Action for Japanese Patent Application No. 2024-539363 mailed Jul. 15, 2025. 10 pages.
Second Japanese Office Action for Japanese Patent Application No. 2024-539363 mailed Jan. 6, 2026. 9 pages.

* cited by examiner

IMAGE SENSOR WITH PARTITION EXPOSURE, PARTITION EXPOSURE CONTROL METHOD, CAMERA MODULE, AND ELECTRONIC DEVICE

CROSS-REFERENCE TO RELATED APPLICATIONS

This application is a continuation of International Application No. PCT/CN2022/142698 filed on Dec. 28, 2022, which claims priority to Chinese Patent Application No. 202111680855.X filed on Dec. 30, 2021, which are incorporated herein by reference in their entireties.

TECHNICAL FIELD

This application relates to the field of image processing technologies, and specifically, to an image sensor, an exposure control method, a camera module, and an electronic device.

BACKGROUND

Quality of an image shot by a camera of a smart terminal depends on exposure accuracy of an image sensor. Currently, a mainstream exposure manner is global exposure, that is, a same exposure parameter is set for each pixel unit, to complete shooting of the image.

In such an exposure mode, overexposure at a light source or underexposure at backlight often occurs, resulting in image distortion.

SUMMARY

This application aims to provide an image sensor, an exposure control method, a camera module, and an electronic device.

To resolve the foregoing technical problem, this application is implemented as follows:

According to a first aspect, an embodiment of this application provides an image sensor, including a photosensitive element, a reset switch, and a signal control circuit, where the signal control circuit includes a voltage logic determining module and a logic control module;

- a first end of the voltage logic determining module is connected to a first end of the photosensitive element, a second end of the voltage logic determining module is connected to a second end of the photosensitive element, and the voltage logic determining module is configured to output, when detecting that a voltage difference between the two ends of the photosensitive element reaches a preset voltage threshold, an automatic control signal to control the reset switch to be turned on to clear electrons in the photosensitive element, and output a counting signal to a first input end of the logic control module; and
- the first input end of the logic control module is connected to the first end of the voltage logic determining module, an output end of the logic control module is connected to the reset switch, the first input end of the logic control module is configured to receive the counting signal, a second input end of the logic control module is configured to receive a control signal, and the logic control module is configured to control, when the control signal meets a preset condition, the reset switch to be turned on to clear the electrons in the photosensitive element.

According to a second aspect, an embodiment of this application provides an exposure control method, applied to the image sensor according to the first aspect of embodiments of this application, where the method includes:

- obtaining preset brightness of a first image, and first partition brightness and first exposure corresponding to each image region of the first image;
- obtaining second exposure corresponding to each image region based on the preset brightness, and the first partition brightness and the first exposure corresponding to each image region; and
- exposing a second image captured by the image sensor based on the second exposure corresponding to each image region.

According to a third aspect, an embodiment of this application provides a camera module, including the image sensor according to any one of descriptions in the first aspect of the embodiments of this application.

According to a fourth aspect, an embodiment of this application provides an electronic device, including the camera module according to the third aspect of the embodiments of this application.

BRIEF DESCRIPTION OF THE DRAWINGS

The foregoing and/or additional aspects and advantages of this application become apparent and readily understood from the following descriptions of the embodiments with reference to the accompanying drawings.

REFERENCE NUMERALS

Figure 1:
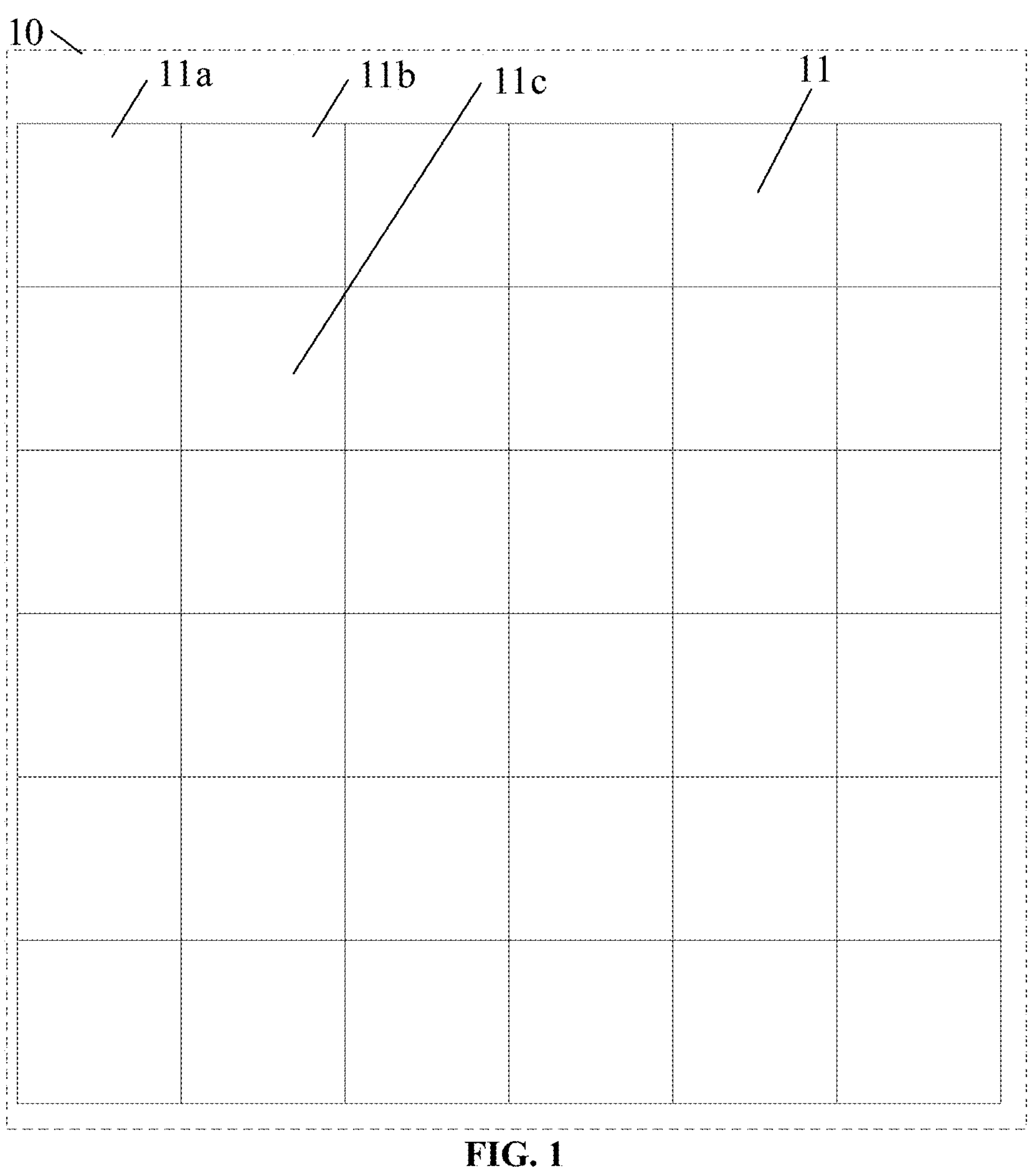
FIG. 1 is a schematic structural diagram of a pixel unit according to an embodiment of this application.

10-image sensor; 11-pixel unit, 11*a*-R pixel unit, 11*b*-G pixel unit, and 11*c*-B pixel unit, 1111-photosensitive element; 1114-first switch; 1115-voltage logic determining module; 1116-reset switch; 1118-logic control module; 112-electric energy storage module; Vs-signal end; VDD-power supply end; GND-ground; RST-restoring switch; SF-source follower; SET-selector switch; Vout-signal output end; 600-camera module; 620-lens; 630-circuit board; 640-optical filter; 650-motor; 660-base; and 670-protective film.

DETAILED DESCRIPTION

The embodiments of this application are described in detail below, and examples of the embodiments are shown in the accompanying drawings, where a same or similar reference numeral indicates a same or similar element or an element having a same or similar function. The embodiments described below with reference to the accompanying drawings are used as examples, merely for explaining this application, and cannot be understood as a limitation to this application. Based on the embodiments of this application, all other embodiments obtained by a person of ordinary skill in the art without creative efforts shall fall within the protection scope of this application.

Features of terms "first" and "second" in the specification and claims of this application may explicitly or implicitly include one or more of the features. In addition, "and/or" in the specification and claims represents at least one of connected objects.

In description of this application, it should be understood that, an orientation or positional relationship indicated by a term "center", "row direction", "column direction", "upper", "lower", or "periphery", is based on an orientation or positional relationship shown in the accompanying drawings, and is only used for ease of description of this application and simplified description, rather than indicating or implying that a referred apparatus or element needs to have a specific orientation, to be constructed and operated in the specific orientation, and therefore cannot be understood as a limitation to this application.

In the description of this application, it should be noted that, unless otherwise clearly stated and limited, a term "connection" should be understood in a broad sense, for example, may be a fixed connection, a detachable connection, or an integral connection; may be a mechanical connection or an electrical connection; and may be a direct connection, an indirect connection through an intermediate medium, or an internal connection between two elements. For a person of ordinary skill in the art, specific meanings of the foregoing terms in this application may be understood on a case-by-case basis.

An embodiment of this application relates to an image sensor, where the image sensor, as a component of a camera module, is configured to sense an optical signal, and convert the optical signal into an electrical signal to be output, to form image data.

A structure of the image sensor according to the embodiments of this application is described below with reference to FIG. 1 to FIG. 4.

Figure 2:
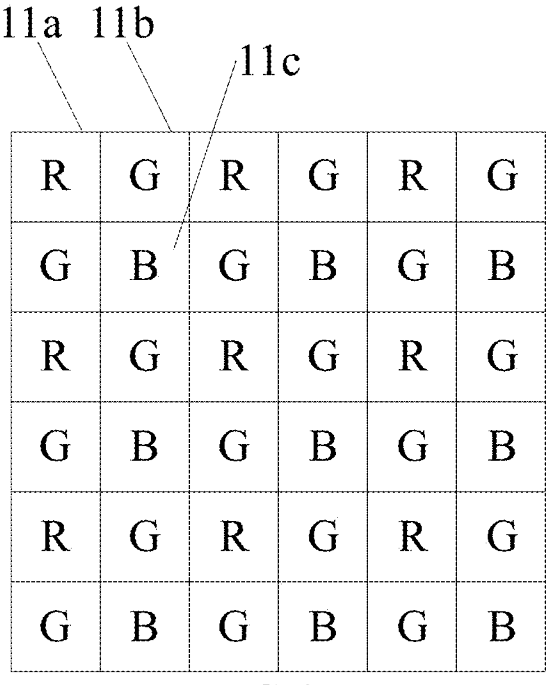
FIG. 2 is a schematic diagram of an arrangement structure of pixel units of an image sensor according to an embodiment of this application.

As shown in FIG. 1 and FIG. 2, an image sensor 10 according to some embodiments of this application includes a plurality of pixel units 11. The pixel units 11 are arranged based on a set rule to form a pixel array, for example, the pixel array sequentially includes an R pixel unit 11*a*, a G pixel unit 11*b*, a B pixel unit 11*c*, and the like. In this embodiment, one pixel unit 11 of the image sensor 10 corresponds to one pixel point of a captured image. For example, the R pixel unit 11*a* corresponds to one pixel point of the captured image, the G pixel unit 11*b* corresponds to one pixel point of the captured image, and the B pixel unit 11*c* corresponds to one pixel point of the captured image.

Figure 3:
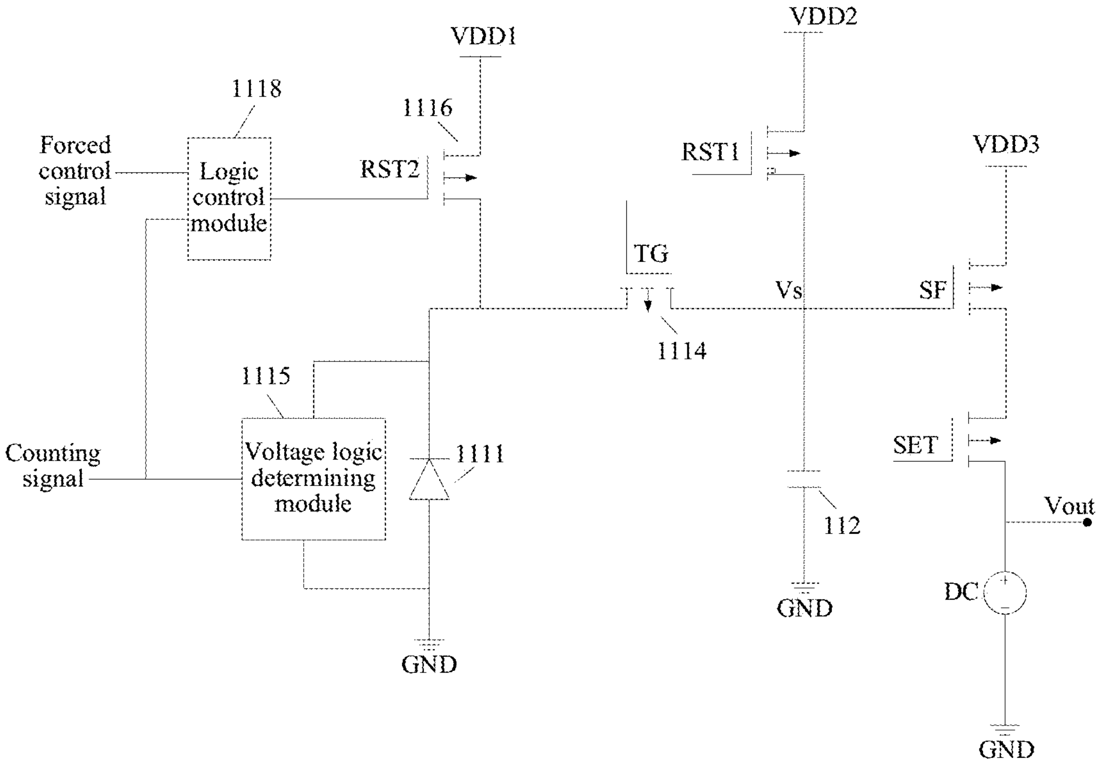
FIG. 3 is a schematic diagram of a circuit structure of the pixel unit in FIG. 1.

As shown in FIG. 3, a pixel unit of the image sensor includes a photosensitive element 1111, where the photosensitive element is a photosensitive diode, and the photosensitive diode may be any one of a red photosensitive diode, a green photosensitive diode, and a blue photosensitive diode. The red photosensitive diode is configured to sense a red (R) optical signal, the green photosensitive diode is configured to sense a green (G) optical signal, and the blue photosensitive diode is configured to sense a blue (B) optical signal.

For example, as shown in FIG. 2, the pixel units are arranged based on the set rule to form a conventional RGB pixel array, where the RGB pixel array may include a red photosensitive element R, a green photosensitive element G, and a blue photosensitive element B. The RGB pixel array may be a Bayer pixel array.

Figure 4:
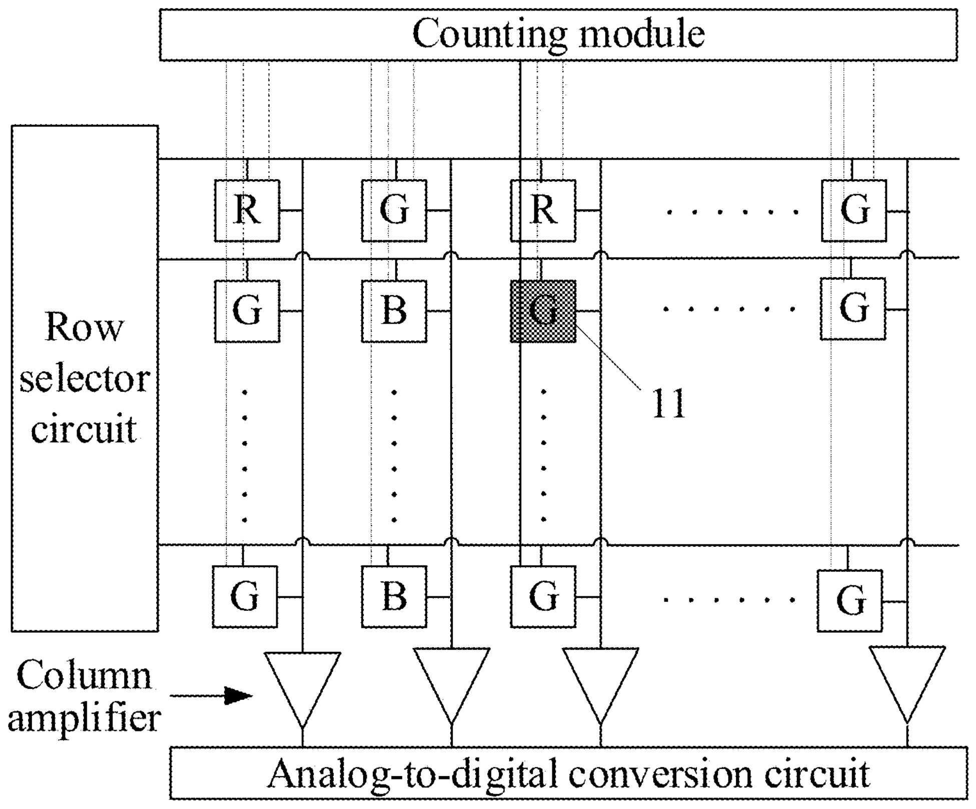
FIG. 4 is a schematic diagram of an arrangement structure of a camera module according to an embodiment of this application.

A camera module shown in FIG. 4 is a complementary metal oxide semiconductor (CMOS) camera module. A general working process of the CMOS camera module is as follows: A large quantity of photosensitive diodes sense optical signals and convert the optical signals into electrical signals, and a digital signal matrix (that is, an image) is formed by amplifying the electrical signals through an amplifier circuit and performing analog-to-digital conversion on the electrical signals through an analog-to-digital conversion circuit. In this embodiment of this application, the camera module uses rolling shutter exposure, that is, the pixel array in the image sensor is exposed in a row-by-row scanning manner, until all pixel units are exposed.

As shown in FIG. 3, the image sensor includes a reset switch 1116 and a signal control circuit. The signal control circuit includes a voltage logic determining module 1115 and a logic control module 1118.

A first end of the voltage logic determining module 1115 is connected to a first end of the photosensitive element 1111, a second end of the voltage logic determining module 1115 is connected to a second end of the photosensitive element 1111, and the voltage logic determining module 1115 is configured to output, when detecting that a voltage difference between the two ends of the photosensitive element 1111 reaches a preset voltage threshold, an automatic control signal to control the reset switch 1116 to be turned on to clear electrons in the photosensitive element 1111, and output a counting signal.

A first input end of the logic control module 1118 is connected to an out end of the voltage logic determining module 1115, an output end of the logic control module 1118 is connected to the reset switch 1116, the first input end of the logic control module 1118 is configured to receive the counting signal, a second input end of the logic control module 1118 is configured to receive a control signal, and the logic control module 1118 is configured to control, when the control signal meets a preset condition, the reset switch 1116 to be turned on to clear the electrons in the photosensitive element 1111. For example, when a forced control signal is received, the logic control module 1118 may control the reset switch 1116 to be turned on to clear the electrons in the photosensitive element 1111.

As shown in FIG. 3, the signal control circuit further includes a first switch 1114, and the photosensitive element 1111 and the first switch 1114 are connected in series between a signal end Vs and a ground GND.

As shown in FIG. 4, a counting module outputs the counting signal. In this embodiment, each pixel unit 11 in the pixel array of the image sensor may be correspondingly provided with a reset switch and a signal control circuit, or any one or more pixel units 11 in the pixel array may be provided with a reset switch and a signal control circuit. For example, the pixel unit 11 represented by a gray box in FIG. 4 may be correspondingly provided with the reset switch and the signal control circuit, and the pixel units except the pixel unit 11 represented by the gray box may not be provided with corresponding reset switches and signal control circuits. Certainly, each pixel unit in FIG. 4 may be correspondingly provided with a reset switch and a signal control circuit.

In this embodiment, for each sampling moment within exposure duration, when the voltage difference of the two ends of the photosensitive element 1111 reaches the preset voltage threshold, the voltage logic determining module

1115 outputs the automatic control signal to control the reset switch 1116 to be turned on to clear the electrons in the photosensitive element 1111, and outputs the counting signal to the first input end of the logic control module 1118 to perform one count. When the control signal meets the preset condition, the logic control module 1118 controls the reset switch 1116 to be turned on to clear the electrons in the photosensitive element 1111. The preset condition may be that the received control signal is the forced control signal. In this way, all brightness information of the photosensitive element 1111 within the exposure duration can be obtained based on a quantity of counting signals of the photosensitive element 1111 at the end of the exposure duration.

The foregoing preset voltage threshold may be a maximum voltage that the photosensitive element 1111 can carry, or may be a half of the maximum voltage that the photosensitive element 1111 can carry, or may be another value. This is not limited herein in this embodiment. For example, exposure parameters are set as follows: 1000-lux light is exposed for 1 ms, and the maximum voltage that the photosensitive element 1111 can carry is 10 V. In this case, the preset voltage threshold may be 10 V or any value less than 10 V, for example, the preset voltage threshold may be 5 V.

For example, when the forced control signal is received, the automatic control signal is to be shielded by the logic control module 1118. Using the exposure duration as 100 ms as an example, when the forced control signal is received, the logic control module 1118 may control the reset switch 1116 to be turned on to clear the electrons in the photosensitive element 1111 when exposure time is 50 ms, thereby exposing the pixel unit for only 50 ms.

For example, the exposure parameters are set as follows: Exposure duration of 1000-lux light is set to 1 ms, the maximum voltage that the photosensitive element 1111 can carry is 10 V, and the preset voltage threshold is 5 V. In this case, if a light intensity of an environment is 2000 lux, for example, at a moment of $0.25^{th}$ ms within the exposure duration, the voltage difference at the two ends of the photosensitive element 1111 may reach the preset voltage threshold, that is, the voltage difference at the two ends of the photosensitive element 1111 is 5 V. In this case, the voltage logic determining module 1115 controls the reset switch 1116 to be turned on and clears the photosensitive electrons in the photosensitive element 1111 to restart exposure. In addition, the voltage logic determining module 1115 outputs a counting signal to perform one count, and in this case, i=0+1.

At a moment of $0.5^{th}$ ms within the exposure duration, the voltage difference at the two ends of the photosensitive element 1111 reaches the preset voltage threshold again, that is, the voltage difference at the two ends of the photosensitive element 1111 is 5 V. In this case, the voltage logic determining module 1115 controls the reset switch 1116 to be turned on and clears the photosensitive electrons in the photosensitive element 1111 to restart exposure. In addition, the voltage logic determining module 1115 outputs the counting signal to perform another count, and in this case, i=0+1+1=2.

At a moment of $0.75^{th}$ ms within the exposure duration, the voltage difference at the two ends of the photosensitive element 1111 reaches the preset voltage threshold again, that is, the voltage difference at the two ends of the photosensitive element 1111 is 5 V. In this case, the voltage logic determining module 1115 controls the reset switch 1116 to be turned on and clears the photosensitive electrons in the photosensitive element 1111 to restart exposure. In addition, the voltage logic determining module 1115 controls the counting signal to perform one count, and in this case, i=0+1+1+1=3.

At an ending moment of the exposure duration of 1 ms, based on brightness information 1024 and a count value 3*1024 of the photosensitive element 1111 at the end of the exposure duration of 1 ms, brightness information, namely, 4096, of the photosensitive element 1111 within the exposure duration of 1 ms may be obtained. In other words, within one exposure duration of a large light ratio scene, the brightness information that can be obtained by the photosensitive element 1111 is 4096. In this way, all brightness information in a backlight shooting scene or the large light ratio scene is obtained, so that overexposure is avoided, and a high-dynamic photosensitive function of the pixel unit is implemented, thereby improving final shot image quality and user experience.

For example, the photosensitive element 1111 is a photosensitive diode, and the reset switch 1116 is a CMOS switch.

As shown in FIG. 3, the image sensor 10 may further include an electric energy storage module 112, where the electric energy storage module 112 is also connected between the signal end Vs and the ground GND. The electric energy storage module 112 includes a capacitor, where the capacitor can store electric energy released by the photosensitive element 1111 for readout.

In this embodiment, using a pixel unit of the image sensor as an example, a photosensitive element 1111 of the pixel unit obtains light energy of a sensed color through one exposure, and converts the light energy into electric energy to be stored in the photosensitive element 1111. When the pixel unit is selected to read out an electrical signal of the pixel unit, first switches 1114 of photosensitive elements 1111 may be controlled to be turned on, so that the corresponding photosensitive elements 1111 release electric energy to the electric energy storage module 112 to be stored for readout.

For example, using a R pixel unit 11*a* of the image sensor as an example, when one exposure is completed by the image sensor and the R pixel unit 11*a* is selected to read out, a first switch 1114 connected in series with a photosensitive element 1111 may be controlled to be turned on. In this case, red light energy is converted by the photosensitive element 1111 to obtain electric energy, so that the electric energy can be transferred to the electric energy storage circuit 112 for readout.

In some embodiments, to facilitate phased readout of electrical signals converted from different photosensitive elements 1111, as shown in FIG. 3, the signal control circuit may further include a restoring switch RST1, where the restoring switch RST1 is connected between a power supply end VDD and the signal end Vs. In this embodiment, when the restoring switch RST1 is controlled to be turned off, the photosensitive element 1111 of the pixel unit may be read out, and after readout of the photosensitive element 1111 is completed, the restoring switch RST1 is controlled to be turned on, so that the photosensitive element 1111 can be restored.

In some embodiments, as shown in FIG. 3, the signal control circuit may further include a source follower SF and a selector switch SET, where a gate of the source follower SF is connected to the signal end Vs, a drain of the source follower SF is connected to the power supply end VDD3, and the selector switch SET is connected between a source of the source follower SF and an output end Vout of the signal control circuit.

In this embodiment, the source follower SF may perform amplification on an electrical signal at the signal end Vs, to improve signal acquisition accuracy. In this embodiment, when scanning the image sensor, the selector switch SET may select pixel units to be scanned each time, where the selector switch SET may be a row selector switch or a column selector switch as needed. This is not limited herein.

For example, as shown in FIG. 4, the selector switch SET is the row selector switch, and the row selector switch may select the pixel units to be scanned each time.

Switches in the foregoing embodiments, including the first switch 1114, the reset switch 1116, the selector switch SET, the source follower SF, and the like, may be complementary metal oxide semiconductor CMOS switches or other types of switches. This is not limited herein.

Next, FIG. 3 is used as an example to describe an exposure process according to embodiments of this application.

Step 202: A switching transistor RST1 and the first switch 1114 are turned on, a voltage is applied to a negative electrode of the photosensitive element 1111 and the electric energy storage module 112, the photosensitive element 1111 is reversely biased, and electrons in the photosensitive element 1111 and the electric energy storage module 112 are cleared to zero.

Step 204: The switching transistor RST1 and the first switch 1114 are turned off, the photosensitive element 1111 starts photosensitive energy storage (corresponding to exposure start time), and a voltage difference starts to generate at two ends.

Step 205: The voltage determining module sends a reset signal to a control end of the reset switch 1116, where the reset switch 1116 is turned on once, a photoelectron in the photosensitive element 1111 is reset, and the photosensitive energy storage is restarted from zero (corresponding to reset time), a voltage difference starts to generate at the two ends; at the same time, the voltage logic determining module 1115 sends the counting signal to the logic control module 1118 to perform one count; or when receiving the forced control signal, the logic control module controls the reset switch 1116 to be turned on once, the photoelectron in the photosensitive element 1111 is reset, the photosensitive energy storage is restarted from zero (corresponding to the reset time), and a voltage difference starts to generate at the two ends.

Step 206: The switching transistor RST1 is turned on to clear the electric energy storage module 112 again, to avoid interference/coupling caused by current electrons generated in an electronic circuit.

Step 208: The switching transistor RST1 is turned off, the first switch 1114 is turned on, a switching transistor SET is turned on (corresponding to exposure end time), energy of the photosensitive element 1111 is stored in the electric energy storage module 112, and a Vout end outputs a voltage signal to a column amplifier corresponding to the pixel unit.

Finally, the voltage signal output by the Vout end is a voltage signal converted into from an optical signal sensed by the photosensitive element 1111 from reset time to the exposure end time.

In this embodiment of this application, an image sensor includes a photosensitive element, a reset switch, and a signal control circuit, where the signal control circuit includes a voltage logic determining module and a logic control module. A first end of the voltage logic determining module is connected to a first end of the photosensitive element, a second end of the voltage logic determining module is connected to a second end of the photosensitive element, and the voltage logic determining module is configured to output, when detecting that a voltage difference of the photosensitive element reaches a preset voltage threshold, an automatic control signal to control the reset switch to be turned on to clear electrons in the photosensitive element, and output a counting signal to a first input end of the logic control module. The first input end of the logic control module is connected to the first end of the voltage logic determining module, an output end of the logic control module is connected to the reset switch, the first input end of the logic control module is configured to receive the counting signal, a second input end of the logic control module is configured to receive a control signal, and the logic control module is configured to control, when the control signal meets a preset condition, the reset switch to be turned on to clear the electrons in the photosensitive element. In this way, the logic control module is set to control the reset switch, and the voltage logic determining module can output the counting signal. After exposure is completed, a photosensitive signal of the photosensitive element can be accurately obtained, and overexposure and underexposure are avoided, so that a high-dynamic photosensitive function of a pixel unit can be implemented, thereby improving image quality.

Figure 5:
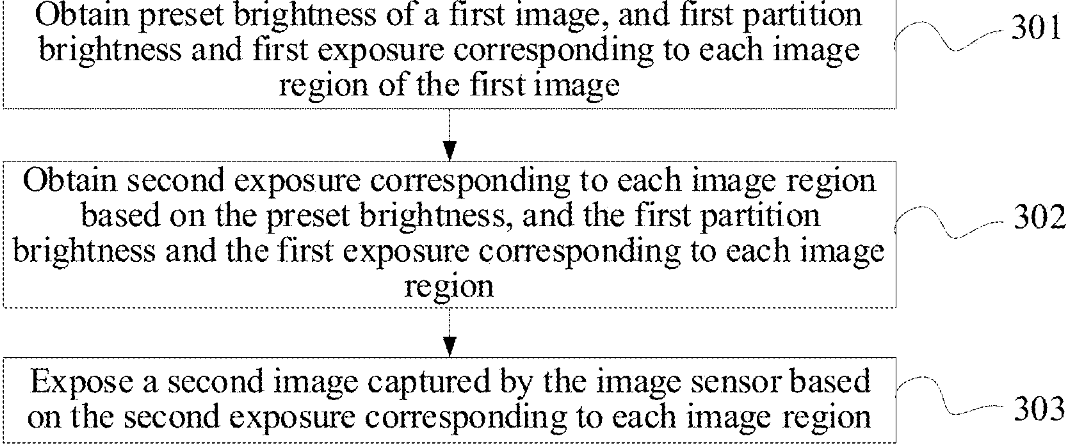
FIG. 5 is a schematic flowchart of an exposure control method according to an embodiment of this application.

As shown in FIG. 5, an embodiment of this application further provides an exposure control method, applied to the image sensor described in the foregoing embodiments.

The exposure control method in this embodiment may include step 301 to step 303.

Step 301: Obtain preset brightness of a first image, and first partition brightness and first exposure corresponding to each image region of the first image.

Step 302: Obtain second exposure corresponding to each image region based on the preset brightness, and the first partition brightness and the first exposure corresponding to each image region.

Step 303: Expose a second image captured by the image sensor based on the second exposure corresponding to each image region.

For example, the first image is divided into 8*8 image regions in advance, and each image region corresponds to one piece of first partition brightness and one piece of first exposure. In this embodiment, first partition brightness $Y^{pre}(i, j)$ corresponding to each image region may be specifically calculated based on a formula $Y^{pre}(i, j)\Sigma^{each\ pixel}(0.299*R+0.587*G+0.114*B)$. R is a red photosensitive signal value, G is a green photosensitive signal value, B is a blue photosensitive signal value, and (i, j) represents the image region.

Assuming that scene brightness does not change (a time interval is very short) when two frames of images are shot, second exposure $M^{cur}(i, j)$ corresponding to each image region may be obtained based on a formula $M^{cur}(i, j)=Y^{target}*M^{pre}(i, j)/Y^{pre}(i, j)$. $Y^{target}$ represents the preset brightness, and $M^{pre}$ represents the first exposure.

In a practical application, the foregoing operation of obtaining the preset brightness of the first image, and the first partition brightness and the first exposure corresponding to each image region of the first image may be executed on each image region of the first image, until the second exposure of each image region is obtained. When the image sensor is controlled to expose the first image, exposure is performed based on the second exposure corresponding to each image region, to output a digital signal to form a raw graph and output the raw graph to an image processing system.

It should be noted that, when a camera is started, the foregoing step 301 to step 303 may be repeated, until the camera is exited.

In one embodiment, the image region may include a foreground image region and a background image region. In other words, partitioning of pixel units is adaptively implemented based on a foreground and a background of the first image, to facilitate adaptability to a shooting scene.

Specifically, in this embodiment, a principle of cutting the foreground image region and the background image region of the first image is to use a maximum inter-class variance method to extract a partition threshold to segment an image gray value.

Specifically, a gray value corresponding to each pixel unit of the first image may be obtained; and based on a comparison result between the gray value and a preset gray threshold T, pixel units are divided into first-type pixel units C1 and second-type pixel units C2, where a gray value of the first-type pixel unit C1 is less than the preset gray threshold T, and a gray value of the second-type pixel unit C2 is greater than the preset gray threshold T.

A first gray value mean m1 of the first-type pixel units, a second gray value mean m2 of the second-type pixel units, a first probability p1 of the first-type pixel units, and a second probability p2 of the second-type pixel units are obtained; based on the first gray value mean m1, the second gray value mean m2, the first probability p1, and the second probability p2, a partition threshold Tmax is obtained; and based on the partition threshold Tmax, a target pixel partition of a target pixel unit in a pixel array is determined.

Specifically, after the first gray value mean m1 of the first-type pixel units, the second gray value mean m2 of the second-type pixel units, the first probability p1 of the first-type pixel units, and the second probability p2 of the second-type pixel units are obtained, a global mean mG may be obtained based on a formula $p1*m1+p2*m2=mG$, where $p1+p2=1$.

An inter-class variance may be indicated as a formula: $\sigma^{\wedge 2}=p1(m1-mG)^{\wedge 2}+p2(m2-mG)^{\wedge 2}$. The formula of the inter-class variance is to be simplified, that is, $p1*m1+p2*m2=mG$ is substituted into the formula of the inter-class variance, and a final inter-class variance expression may be obtained: $\sigma^{\wedge 2}=p1p2\ (m1-m2)^{\wedge 2}$.

It should be noted that, during a calculation process, a value of T is from 0 to 255. In this embodiment, all values of T are traversed to obtain 256 inter-class variances, a maximum value is used as the partition threshold Tmax in this embodiment, and then the foreground image region and the background image region of the first image are determined based on the partition threshold Tmax.

After the foreground image region and the background image region of the first image are obtained, second exposure respectively corresponding to the foreground image region and the background image region may be obtained by performing the foregoing step 301 to step 303. When the image sensor is controlled to expose the first image, exposure is performed based on the second exposure corresponding to each image region, to output the digital signal to form the raw graph and output the raw graph to the image processing system.

In this embodiment, partition exposure is performed on each image region, so that exposure precision can be improved, thereby further improving image quality.

Figure 6:
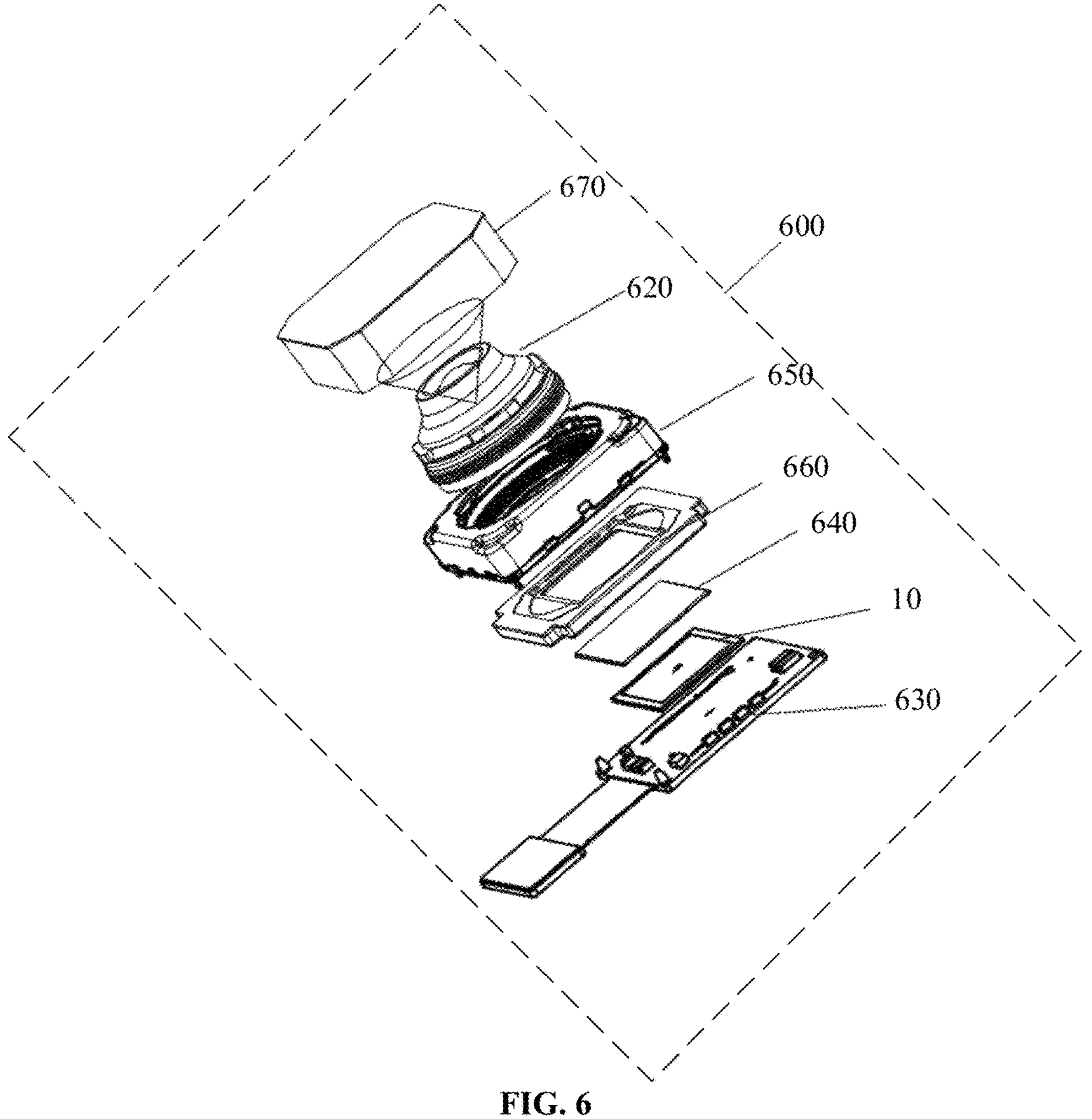
FIG. 6 is a schematic structural diagram of another camera module according to an embodiment of this application.

As shown in FIG. 6, an embodiment of this application further provides a camera module 600, where the camera module 600 includes an image sensor 10, and the image sensor 10 may be the image sensor 10 according to any one of the foregoing embodiments.

In some embodiments, the camera module 600 further includes a lens 620 and a circuit board 630, where the image sensor 10 is electrically connected to the circuit board 630. A signal processing unit and an analog-to-digital converter may be disposed on the circuit board 630, to convert an analog electrical signal output by the image sensor 10 into a digital signal through the analog-to-digital converter, and output the digital signal to the signal processing unit for signal processing, thereby obtaining image data. The lens 620 is disposed on a side of the image sensor 10 away from the circuit board 630, that is, a light incident surface of the image sensor 10 faces the lens 620.

In some embodiments, to improve shooting performance of the camera module 600, the camera module 600 may further include an optical filter 640, and the optical filter 640 is disposed between the image sensor 10 and the lens 620, to filter infrared light invisible to human eyes during daytime, to improve effective resolution and color reproduction of a captured image, thereby further improving quality of the captured image.

In some embodiments, the camera module 600 may further include a motor 650, and the motor 650 is connected to the lens 620, to drive the lens 620 to move.

In some embodiments, the camera module 600 may drive the lens 620 to move by controlling the motor 650, thereby implementing automatic zooming.

In some embodiments, the camera module 600 may further include a base 660 for mounting the motor 650, to facilitate mounting of the motor 650.

In some embodiments, the camera module 600 may further include a protective film 670 disposed on the lens 620, to protect the lens 620 from being damaged.

For the camera module 600 in this embodiment, all information of a large light ratio scene may be obtained through only one exposure by the image sensor without multi-frame synthesis, so that shot image quality can be effectively improved, thereby improving image quality.

An embodiment of this application further provides an electronic device, where the electronic device includes the camera module according to any one of the foregoing embodiments.

For example, the electronic device includes a housing, where the housing has a light-transmitting part. The camera module may be disposed in the housing of the electronic device, and a lens of the camera module faces the light-transmitting part, so that image acquisition can be performed through the light-transmitting part.

The electronic device may be any device having a photographing function, such as a mobile phone, a tablet computer, a notebook computer, or a wearable device. This is not limited herein.

Each of the foregoing embodiments focuses on describing a difference between a corresponding embodiment and another embodiment, and a same or similar part of each embodiment may refer to each other.

In description of this specification, reference terms such as "one embodiment", "some embodiments", "an illustrative embodiment", "an example", "a specific example", or "some examples" are intended to describe that, with reference to a specific feature, structure, material, or characteristic described in an embodiment or example, the specific feature, structure, material, or characteristic is included in at least one embodiment or example of this application. In this specification, schematic representation of the foregoing terms does not necessarily refer to a same embodiment or example. In addition, the described specific feature, structure, material, or the characteristic may be combined in any one or more embodiments or examples in a suitable manner.

Although the embodiments of this application have been shown and described, a person of ordinary skill in the art may understand that, a various change, modification, substitution, and variation may be performed to those embodiments without departing from a principle and spirit of this application, and the scope of this application is limited by the claims and equivalents thereof.

What is claimed is:

1. An image sensor, comprising a photosensitive element, a reset switch, and a signal control circuit, wherein the signal control circuit comprises a voltage logic determining module and a logic control module;

a first end of the voltage logic determining module is connected to a first end of the photosensitive element, a second end of the voltage logic determining module is connected to a second end of the photosensitive element, and the voltage logic determining module is configured to output, when detecting that a voltage difference between the two ends of the photosensitive element reaches a preset voltage threshold, an automatic control signal to control the reset switch to be turned on to clear electrons in the photosensitive element, and output a counting signal to a first input end of the logic control module; and the first input end of the logic control module is connected to an output end of the voltage logic determining module, an output end of the logic control module is connected to the reset switch, the first input end of the logic control module is configured to receive the counting signal, a second input end of the logic control module is configured to receive a control signal, and the logic control module is configured to control, when the control signal meets a preset condition, the reset switch to be turned on to clear the electrons in the photosensitive element;

wherein obtaining preset brightness of a first image, and first partition brightness and first exposure corresponding to each image region of the first image, when performing exposure based on the image sensor;

obtaining second exposure corresponding to each image region based on the preset brightness, and the first partition brightness and the first exposure corresponding to each image region; and exposing a second image captured by the image sensor based on the second exposure corresponding to each image region.

2. The image sensor according to claim 1, wherein the signal control circuit further comprises a first switch; and the photosensitive element and the first switch are connected in series between a signal end and a ground.

3. The image sensor according to claim 1, wherein the signal control circuit further comprises an electric energy storage module, and the electric energy storage module is connected between a signal end and a ground.

4. The image sensor according to claim 3, wherein the electric energy storage module comprises a capacitor.

5. The image sensor according to claim 1, wherein the signal control circuit further comprises a restoring switch, and the restoring switch is connected between a power supply end and a signal end.

6. The image sensor according to claim 1, wherein the signal control circuit further comprises a source follower and a selector switch, a gate of the source follower is connected to a signal end, a drain of the source follower is connected to a power supply end, and the selector switch is connected between a source of the source follower and an output end of the signal control circuit.

7. An exposure control method, applied to an image sensor, wherein the image sensor comprises a photosensitive element, a reset switch, and a signal control circuit, wherein the signal control circuit comprises a voltage logic determining module and a logic control module;

a first end of the voltage logic determining module is connected to a first end of the photosensitive element, a second end of the voltage logic determining module is connected to a second end of the photosensitive element, and the voltage logic determining module is configured to output, when detecting that a voltage difference between the two ends of the photosensitive element reaches a preset voltage threshold, an automatic control signal to control the reset switch to be turned on to clear electrons in the photosensitive element, and output a counting signal to a first input end of the logic control module; and the first input end of the logic control module is connected to the first an output end of the voltage logic determining module, an output end of the logic control module is connected to the reset switch, the first input end of the logic control module is configured to receive the counting signal, a second input end of the logic control module is configured to receive a control signal, and the logic control module is configured to control, when the control signal meets a preset condition, the reset switch to be turned on to clear the electrons in the photosensitive element;

wherein the method comprises:

obtaining preset brightness of a first image, and first partition brightness and first exposure corresponding to each image region of the first image;

obtaining second exposure corresponding to each image region based on the preset brightness, and the first partition brightness and the first exposure corresponding to each image region; and exposing a second image captured by the image sensor based on the second exposure corresponding to each image region.

8. The method according to claim 7, wherein the image region comprises a foreground image region and a background image region.

9. The method according to claim 7, wherein the signal control circuit further comprises a first switch; and the photosensitive element and the first switch are connected in series between a signal end and a ground.

10. The method according to claim 7, wherein the signal control circuit further comprises an electric energy storage module, and the electric energy storage module is connected between a signal end and a ground.

11. The method according to claim 10, wherein the electric energy storage module comprises a capacitor.

12. The method according to claim 7, wherein the signal control circuit further comprises a restoring switch, and the restoring switch is connected between a power supply end and a signal end.

13. The method according to claim 7, wherein the signal control circuit further comprises a source follower and a selector switch, a gate of the source follower is connected to a signal end, a drain of the source follower is connected to a power supply end, and the selector switch is connected between a source of the source follower and an output end of the signal control circuit.

14. A camera module, comprising an image sensor, wherein the image sensor comprises a photosensitive element, a reset switch, and a signal control circuit, wherein the signal control circuit comprises a voltage logic determining module and a logic control module;

a first end of the voltage logic determining module is connected to a first end of the photosensitive element, a second end of the voltage logic determining module is connected to a second end of the photosensitive element, and the voltage logic determining module is configured to output, when detecting that a voltage difference between the two ends of the photosensitive element reaches a preset voltage threshold, an automatic control signal to control the reset switch to be turned on to clear electrons in the photosensitive element, and output a counting signal to a first input end of the logic control module; and the first input end of the logic control module is connected to an output end of the voltage logic determining module, an output end of the logic control module is connected to the reset switch, the first input end of the logic control module is configured to receive the counting signal, a second input end of the logic control module is configured to receive a control signal, and the logic control module is configured to control, when the control signal meets a preset condition, the reset switch to be turned on to clear the electrons in the photosensitive element;

wherein obtaining preset brightness of a first image, and first partition brightness and first exposure corresponding to each image region of the first image, when performing exposure based on the image sensor;

obtaining second exposure corresponding to each image region based on the preset brightness, and the first partition brightness and the first exposure corresponding to each image region; and exposing a second image captured by the image sensor based on the second exposure corresponding to each image region.

15. The camera module according to claim 14, wherein the camera module further comprises:

a circuit board, wherein the image sensor is electrically connected to the circuit board; and a lens, wherein the lens is disposed on a side of the image sensor away from the circuit board.

16. The camera module according to claim 14, wherein the signal control circuit further comprises a first switch; and the photosensitive element and the first switch are connected in series between a signal end and a ground.

17. The camera module according to claim 14, wherein the signal control circuit further comprises an electric energy storage module, and the electric energy storage module is connected between a signal end and a ground.

18. The camera module according to claim 17, wherein the electric energy storage module comprises a capacitor.

19. The camera module according to claim 14, wherein the signal control circuit further comprises a restoring switch, and the restoring switch is connected between a power supply end and a signal end.

20. An electronic device, comprising the camera module according to claim 14.

* * * * *